US012771895B2

(12) United States Patent
Nielsen

(10) Patent No.: US 12,771,895 B2
(45) Date of Patent: Oct. 20, 2026

(54) METHODS, SYSTEMS, AND DEVICES FOR METERING DEVICE CALIBRATION

(71) Applicant: The Nielsen Company (US), LLC, New York, NY (US)

(72) Inventor: Christen V. Nielsen, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 19/261,647

(22) Filed: Jul. 7, 2025

(65) Prior Publication Data

US 2026/0181202 A1 Jun. 25, 2026

Related U.S. Application Data

(60) Provisional application No. 63/736,137, filed on Dec. 19, 2024.

(51) Int. Cl.
*H04N 21/422* (2011.01)
*H04R 3/00* (2006.01)

(52) U.S. Cl.
CPC ....... *H04N 21/42203* (2013.01); *H04R 3/005* (2013.01)

(58) Field of Classification Search
None
See application file for complete search history.

(56) References Cited

U.S. PATENT DOCUMENTS 8,601,163 B2 12/2013 Ramaswamy et al.
8,806,535 B2 8/2014 Wright et al.
9,031,268 B2 * 5/2015 Fejzo ...................... H04S 7/303 381/310
9,264,748 B2 * 2/2016 Nielsen ................. H04L 67/535
10,356,471 B2 7/2019 Fisch et al.
10,820,120 B2 * 10/2020 Leppanen .............. H04R 3/005
2014/0282663 A1 * 9/2014 Lee .................. H04N 21/44213 725/18
2015/0365721 A1 * 12/2015 Nielsen ............. H04N 21/4394 725/18
2018/0192223 A1 * 7/2018 Satheesh ................ H04S 7/301
2026/0040023 A1 * 2/2026 Makinen ................ H04S 7/307

* cited by examiner

*Primary Examiner* — James R Marandi

(74) *Attorney, Agent, or Firm* — McDonnell Boehnen Hulbert & Berghoff LLP

(57) ABSTRACT

Example techniques for calibrating a metering device are disclosed. An example method comprises: (a) capturing, via a first microphone, audio content from a media presentation device; (b) generating a first set of fingerprints; (c) transmitting the first set of fingerprints; (d) receiving a first correlation rate, wherein the first correlation rate indicates correlation between the first set of fingerprints and a first set of reference fingerprints; (e) capturing, via a second microphone, the audio content; (f) generating a second set of fingerprints; (g) transmitting the second set of fingerprints; (h) receiving a second correlation rate, wherein the second correlation rate indicates correlation between the second set of fingerprints and a second set of reference fingerprints; (i) determining that the second correlation rate is greater than the first correlation rate; and (j) based on determining that the second correlation rate is greater, stopping capturing the audio content by the first microphone.

20 Claims, 4 Drawing Sheets

METHODS, SYSTEMS, AND DEVICES FOR METERING DEVICE CALIBRATION

CROSS-REFERENCE TO RELATED APPLICATIONS

This application is a non-provisional of, and claims priority to, U.S. Provisional Pat. App. No. 63/736,137 filed Dec. 19, 2024, which is hereby incorporated by reference herein in its entirety.

SUMMARY

In one aspect, an example method for calibrating a metering device is disclosed. The example method includes: (a) capturing, via a first microphone of a plurality of microphones of a metering device, audio content from a media presentation device, wherein the first microphone is associated with a first orientation; (b) based on the audio content captured by the first microphone, generating, by the metering device, a first set of fingerprints; (c) transmitting, by the metering device, the first set of fingerprints to a computing device; (d) receiving, from the computing device, a first correlation rate, wherein the first correlation rate indicates correlation between the first set of fingerprints and a first set of reference fingerprints stored in a reference fingerprint library; (e) capturing, via a second microphone of the plurality of microphones of the metering device, the audio content, wherein the second microphone is associated with a second orientation; (f) based on the audio content captured by the second microphone, generating, by the metering device, a second set of fingerprints; (g) transmitting, by the metering device, the second set of fingerprints to the computing device; (h) receiving, from the computing device, a second correlation rate, wherein the second correlation rate indicates correlation between the second set of fingerprints and a second set of reference fingerprints stored in the reference fingerprint library; (i) determining, by the metering device, that the second correlation rate is greater than the first correlation rate; and (j) based on determining that the second correlation rate is greater, stopping, by the metering device, capturing the audio content by the first microphone.

In another aspect, an example tangible, non-transitory computer readable medium is disclosed. The example tangible, non-transitory computer readable medium includes instructions that, when executed, cause at least one processor to perform a set of operations including: (a) capturing, via a first microphone of a plurality of microphones of a metering device, audio content from a media presentation device, wherein the first microphone is associated with a first orientation; (b) based on the audio content captured by the first microphone, generating, by the metering device, a first set of fingerprints; (c) transmitting, by the metering device, the first set of fingerprints to a computing device; (d) capturing, via a second microphone of the plurality of microphones of the metering device, the audio content, wherein the second microphone is associated with a second orientation; (e) based on the audio content captured by the second microphone, generating, by the metering device, a second set of fingerprints; (f) transmitting, by the metering device, the second set of fingerprints to the computing device; (g) receiving, from the computing device, an indication that a second correlation rate is greater than the first correlation rate, wherein the first correlation rate indicates correlation between the first set of fingerprints and a first set of reference fingerprints stored in a reference fingerprint library, wherein the second correlation rate indicates correlation between the second set of fingerprints and a second set of reference fingerprints stored in the reference fingerprint library, wherein the indication that the second correlation rate is greater than the first correlation rate is determined by the computing device; and (h) based on determining that the second correlation rate is greater, stopping, by the metering device, capturing the audio content by the first microphone.

In another aspect, an example computing system is disclosed. The example computing system includes: (a) at least one processor; and (b) tangible, non-transitory computer readable medium including instructions that, when executed, cause the at least one processor to perform a set of operations including: (a) capturing, via a first microphone of a plurality of microphones of a metering device, audio content from a media presentation device, wherein the first microphone is associated with a first orientation; (b) based on the audio content captured by the first microphone, generating, by the metering device, a first set of fingerprints; (c) transmitting, by the metering device, the first set of fingerprints to a computing device; (d) receiving, from the computing device, a first correlation rate, wherein the first correlation rate indicates correlation between the first set of fingerprints and a first set of reference fingerprints stored in a reference fingerprint library; (e) capturing, via a second microphone of the plurality of microphones of the metering device, the audio content, wherein the second microphone is associated with a second orientation; (f) based on the audio content captured by the second microphone, generating, by the metering device, a second set of fingerprints; (g) transmitting, by the metering device, the second set of fingerprints to the computing device; (h) receiving, from the computing device, a second correlation rate, wherein the second correlation rate indicates correlation between the second set of fingerprints and a second set of reference fingerprints stored in the reference fingerprint library; (i) determining, by the metering device, that the second correlation rate is greater than the first correlation rate; and (j) based on determining that the second correlation rate is greater, stopping, by the metering device, capturing the audio content by the first microphone.

Figure 1:
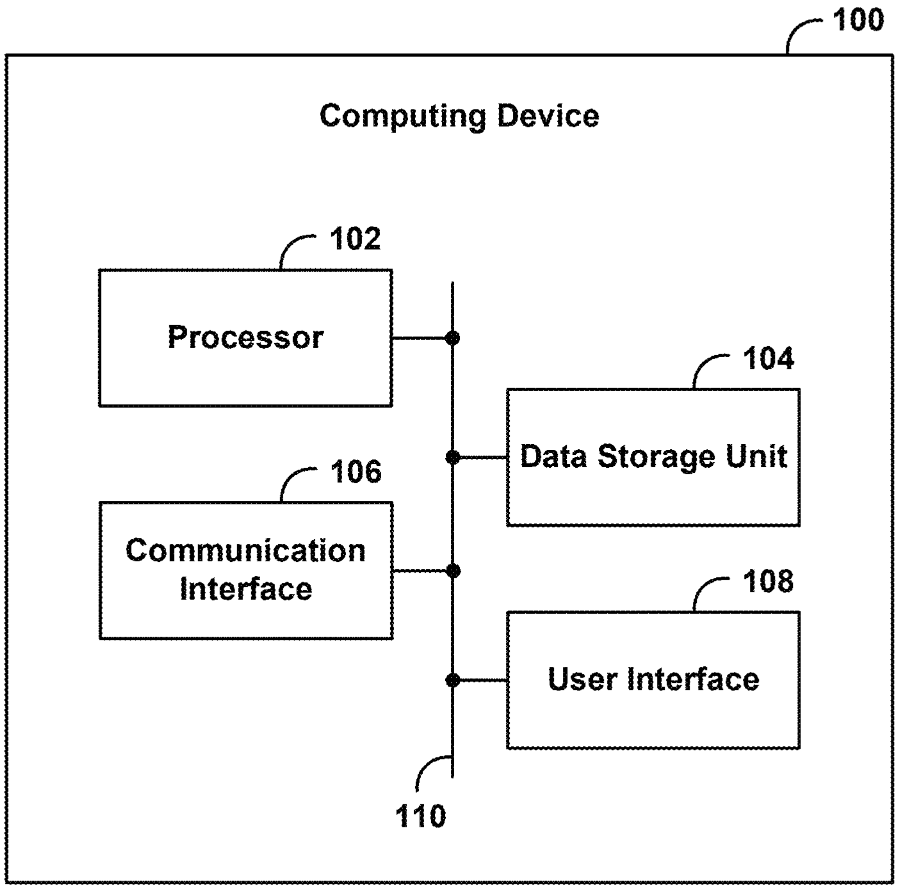
FIG. 1 illustrates a simplified block diagram of an example computing device.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

In this disclosure, unless otherwise specified and/or unless the particular context clearly dictates otherwise, the terms "a" or "an" mean at least one, and the term "the" means the at least one.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments may be utilized and other changes may be made without departing from the scope of the subject matter presented herein.

Accordingly, the example embodiments described herein are not meant to be limiting. It will be readily understood that the aspects of the present disclosure, as generally described herein, and illustrated in the figures, may be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

A metering device may be used in an audience measurement system to identify media content being presented to and/or consumed by an audience. For example, a metering device may record, analyze, and send information about monitored media content to an identification server in the audience measurement system to identify the media content. For example, the metering device may send a copy of the media content that has been recorded, one or more watermarks detected in the media content, and/or one or more fingerprints generated based on the media content, any, some, or all of which may be used to aid in identification of the content being presented to the audience.

In some examples, the metering device includes one or microphones that are used to monitor audio content. A microphone of a metering device may not be optimally oriented to receive the audio content and, as a result, the audio content may not be able to be reliably identified. In some examples, if the metering device includes more than one microphone, one or more additional microphones of the metering device may be better oriented to receive the audio content. However, identification of these microphones and the associated calibration of these microphones and/or other components of the metering device is often difficult and time intensive, caused, at least in part, by processing, storage, and/or bandwidth limitations, and in turn present difficulties with timely, consistent, and accurate audio content analysis.

This disclosure describes various techniques for calibrating a metering device in an audience measurement system. More particularly, as discussed below, disclosed embodiments provide for efficient selection of one or more microphones in a plurality of microphones (for example, a microphone array) of a metering device. The example methods, systems, and devices described herein provide for dynamic audio analysis by improving, among other things, the quality of audio content recording using one or more selected (and often updated) microphones of a plurality of microphones, while also significantly reducing storage, processing, and/or bandwidth requirements to do so as compared to other techniques. In addition, certain embodiments detailed herein provide for specific arrangements of microphones in an array of an acoustic metering device to improve the efficient calibration of the metering device. Further, certain embodiments utilize waveguides to improve the efficient calibration of the metering device.

FIG. 1 illustrates a simplified block diagram of an example computing device 100. Computing device 100 may perform various acts and/or functions, such as those described in this disclosure. Computing device 100 may include various components, such as processor 102, data storage unit 104, communication interface 106, and/or user interface 108. These components may be connected to each other (or to another device, system, or other entity) via connection mechanism 110.

Processor 102 may include a general-purpose processor (for example, a microprocessor) and/or a special-purpose processor (for example, a digital signal processor ("DSP")).

Data storage unit 104 may include one or more volatile, non-volatile, removable, and/or non-removable storage components, such as magnetic, optical, or flash storage, and/or may be integrated in whole or in part with processor 102. Further, data storage unit 104 may take the form of a non-transitory computer-readable storage medium, having stored thereon program instructions (for example, compiled or non-compiled program logic and/or machine code) that, when executed by processor 102, cause computing device 100 to perform one or more acts and/or functions, such as those described in this disclosure. As such, computing device 100 may be configured to perform one or more acts and/or functions, such as those described in this disclosure. Such program instructions may define and/or be part of a discrete software application. In some instances, computing device 100 may execute program instructions in response to receiving an input, such as from communication interface 106 and/or user interface 108. Data storage unit 104 may also store other types of data, such as those types described in this disclosure.

Communication interface 106 may allow computing device 100 to connect to and/or communicate with another other entity according to one or more protocols. In one example, communication interface 106 may be a wired interface, such as an Ethernet interface or a high-definition serial-digital-interface ("HD-SDI"). In another example, communication interface 106 may be a wireless interface, such as a radio, cellular, or WI-FI® interface. In this disclosure, a connection may be a direct connection or an indirect connection, the latter being a connection that passes through and/or traverses one or more entities, such as a router, switcher, or other network device. Likewise, in this disclosure, a transmission may be a direct transmission or an indirect transmission. Further, the term "connection mechanism" as used therein refers to one or more mechanisms that facilitate communication between two or more components, devices, systems, or other entities. A connection mechanism may be a relatively simple mechanism, such as a cable or system bus, or a relatively complex mechanism, such as a packet-based communication network (for example, the Internet). In some instances, a connection mechanism may include a non-tangible medium (for example, in the case where the connection is wireless).

User interface 108 may facilitate interaction between computing device 100 and a user of computing device 100, if applicable. As such, user interface 108 may include input components such as a keyboard, a keypad, a mouse, a touch sensitive panel, a microphone, and/or a camera, and/or output components such as a display device (which, for example, may be combined with a touch sensitive panel), a sound speaker, and/or a haptic feedback system. More generally, user interface 108 may include hardware and/or software components that facilitate interaction between computing device 100 and the user of the computing device 100.

In this disclosure, the term "computing system" means a system that includes at least one computing device, such as computing device 100. A computing system and/or components thereof may perform various acts, such as those set forth below.

Figure 2:
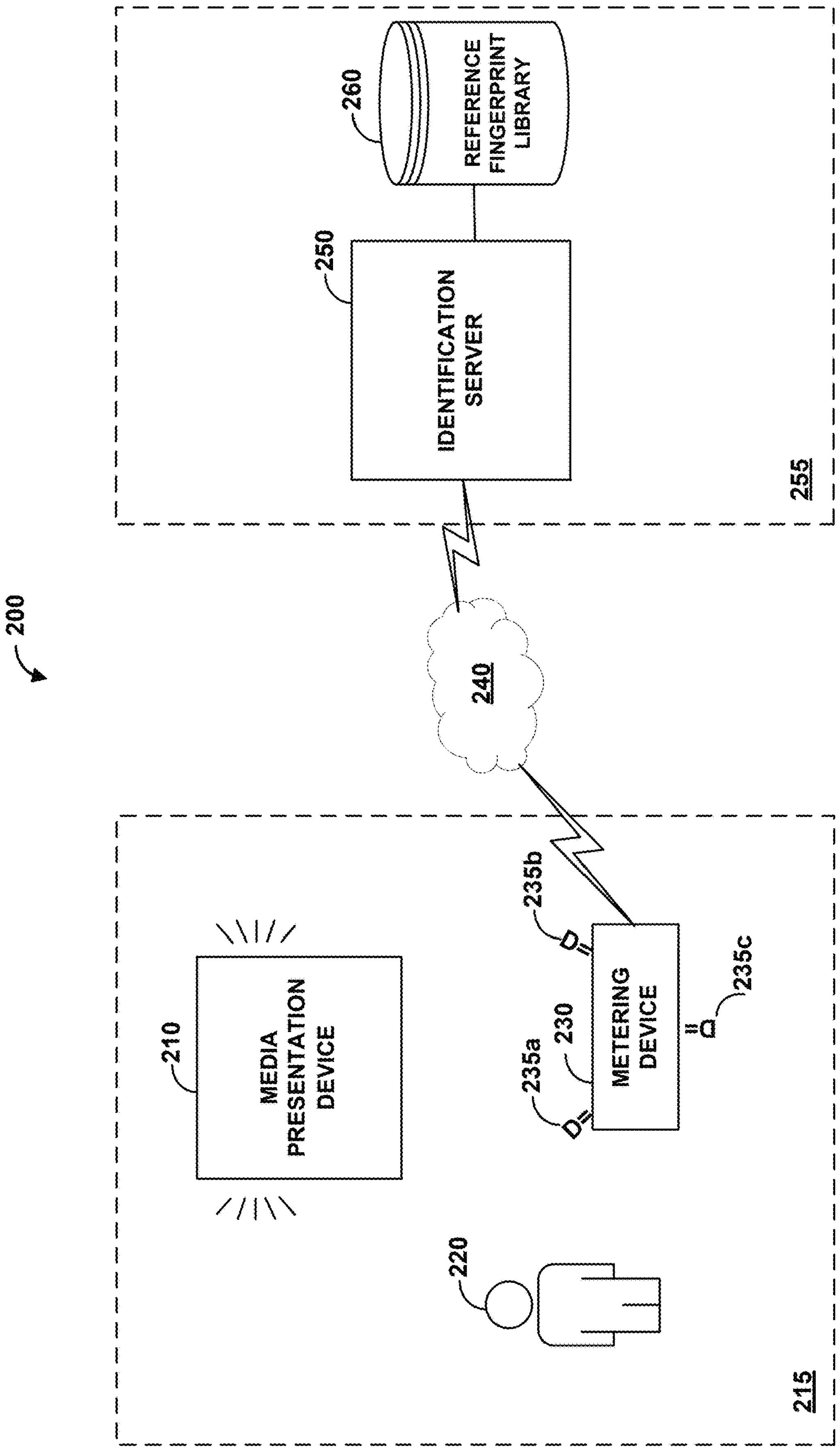
FIG. 2 illustrates a simplified block diagram of an example audience measurement system in which certain embodiments may be employed.

FIG. 2 illustrates a simplified block diagram of an example audience measurement system 200 in which certain embodiments may be employed. In an example embodiment, the audience measurement system 200 includes a media presentation device 210, an audience member 220, a metering device 230, an identification server 250, and a reference fingerprint library 260. In examples, the metering device 230 includes a plurality of microphones. For example, and without loss of generality, as illustrated in FIG. 2, the plurality of microphones includes 3 microphones 235*a*, 235*b*, and 235*c*, which will be referenced in the following discussion. However, other embodiments may have two or more microphones, such as 2, 4, 5, 6, 10, 12, or some other number of microphones, for example. As shown in FIG. 2, there is a first box 215 that encompasses the media presentation device 210, the audience member 220, and the metering device 230 and a second box 255 that encompasses the identification server 250 and the reference fingerprint library 260. Although box 215 and box 255 are shown as two separate locations or environments, it would be understood by one of ordinary skill in the art that one or more of the components in box 215 could be in box 255 and that one or more of the components in box 255 could be in box 215 and that these components could be arranged in other ways. In some examples, box 215 may represent a media exposure environment, such as a house of the audience member 220 or a living room, kitchen, or bedroom of the house of the audience member 220. As another example, the media exposure environment may be outside of the house of the audience member 220, such a theater, bar, restaurant, or a house of another audience member. In some examples, box 255 may represent one or more data collection facilities, which can be, for example, associated with an audience measurement entity. In some examples, the one or more data collection facilities are remote from the media exposure environment.

In a further aspect, in examples, the media presentation device 210 streams, broadcasts, and/or otherwise outputs media content such as audio content and/or video content. For example, the media presentation device 210 may provide audio content by itself or as part of video content. The media presentation device 210 may include, for example, a television, radio, audio content streaming device, computer, cell phone, smartphone, laptop, or tablet. The media content may include, for example, a television show, a movie, a video game, or music. In examples, the content provided by the media presentation device 210 may be presented to and/or consumed by one or more audience members, such as audience member 220.

The audience member 220 may be one of several audience members (not specifically illustrated in FIG. 2) that consume media content from the media presentation device 210. For example, the audience member 220 may watch a movie or listen to a radio program provided by the media presentation device 210.

In examples, metering device 230 monitors media content provided by the media presentation device 210 (and consumed by the audience member 220) to support identification of the media content by the audience measurement system 200. In some examples, the metering device 230 records the audio content outputted by the media presentation device 210 and undertakes one or more identification protocols (for example, fingerprinting and/or comparative fingerprinting analysis) to assist in identification of the audio content.

To do so, in examples, the metering device 230 includes a plurality of microphones 235*a*, 235*b*, and 235*c*. As illustrated in FIG. 2, each of the plurality of microphones 235*a*, 235*b*, and 235*c* is associated with a particular orientation in relation to the metering device 230. For example, a first microphone 235*a* may be positioned to receive audio content originating from the front of the metering device 230, while another microphone 235*c* may be positioned to receive audio content originating from behind the metering device 230. As another example, as shown in FIG. 2, the metering device 230 may include two front-facing microphones 235*a* and 235*b* that are on opposing ends of the front face of the metering device 230. As another example, the plurality of microphones may be arranged in a circular arrangement. As another example, microphones of the metering device 230 may be in other arrangements and orientations, such as one or more front facing, one or more back facing, one or more side facing, one or more up facing (such as towards the ceiling), one or more down facing (such as towards the floor), one or configured at an angle in relation to a face of the metering device 230, etc. As another example, one or more of the plurality of microphones 235*a*, 235*b*, and 235*c*, may include an acoustic waveguide and/or other physical components that improve the ability of the one or more microphones of the plurality of microphones to receive an audio signal (for example, an acoustic baffle). Other examples are possible.

In examples, the metering device 230 is positioned so that at least one of the plurality of microphones 235*a*, 235*b*, and 235*c* is oriented towards the speakers or other audio output of the media presentation device 210. In other examples, metering device 230 is positioned so that two microphones (235*a* and 235*b*) of the plurality of microphones are oriented towards the speakers or other audio output of the media presentation device 210, while a third microphone (235*c*) is located on an opposing surface of the metering device 230. This arrangement may present one or more specific design advantages, including that microphone 230*c* is able to capture audio content throughout other portions of the environment in which the metering device 230 is operating (for example, from a speaker outputting audio content that may be disposed behind the metering device 230, from audio content that may be reflected off one or more surfaces behind the metering device 230), among other possibilities.

In examples, the identification server 250 includes a computing device that processes fingerprints to attempt to identify a piece of media content associated with the fingerprints. In example embodiments, the identification server 250 may use the reference fingerprint library 260 to attempt to identify the piece of media content.

In examples, the metering device 230 monitors the media content by capturing audio content from the media presentation device 210 using one or more of the microphones 235*a*, 235*b*, and 235*c*. In examples, a set of fingerprints is generated based on the captured audio content. For example, the metering device 230 may include a processor for generating representations the audio content. In some examples, these representations may include one or more fingerprints and/or sub-fingerprints that are generated to represent the audio content. As another example, the metering device 230 may utilize a separate device (not shown) to generate the fingerprints for the captured audio content.

To generate these representations of the audio content, example methods, apparatus, systems and articles of manufacture disclosed herein, may dynamically analyze the audio content (e.g., outputted by the media presentation device) based on real-time characteristics of audio signals. For example, the metering device may determine a frequency representation (e.g., a CQT representation) of a sample (e.g., a three second sample) of the audio content and query one or more sources to identify one or more audio content matches based on matching specific audio characteristics of the audio content to one or more pieces of reference audio content and/or representations of the reference audio content (e.g., reference fingerprints and/or reference sub-fingerprints). In examples, the query audio sample of the audio content (e.g., three seconds of audio in the content) may be analyzed and compared against a reference audio database on a regular basis (e.g., every second) to determine potential matches and also to account for changes in the audio content over time (e.g., different portions of the track having different characteristics, transitions in songs, transitions in genres, etc.).

In examples, once the set of fingerprints is generated, the set of fingerprints is communicated to the identification server 250. For example, the metering device 230 may be configured to communicate the set of fingerprints to the identification server 250 over network 240. In some instances, the metering device 230 communicates over network 240 using a communication interface, such as communications interface 106. For example, network 240 may include a wired and/or wireless network. As another example, network 240 may include a radio network, a cellular network, and/or the Internet. In some examples, the set of fingerprints may be communicated by a separate device (not shown), such as the separate device used by the metering device 230 to generate the fingerprints. The fingerprints may be communicated by transmitting using a communications interface, such as communications interface 106, for example.

In examples, the identification server 250 receives the set of fingerprints. The identification server then attempts to identify the media content associated with the fingerprints using the reference fingerprint library 260. For example, the identification server 250 may compare the set of fingerprints associated with media content to reference fingerprints stored in the reference fingerprint library 260. Based on the comparison, the identification server 250 may identify one or more reference media files that are within a threshold likelihood of being the media content provided by the media presentation device 210. To do so, in examples, the identification server may identify the portion of audio content via a variety of processes, including a comparison of a fingerprint of the audio content to reference fingerprints of known media (e.g., reference audio content). For example, the identification server 250 may generate and/or access query fingerprints for a frame or block of frames of the portion of the audio content outputted by the media presentation device 210 and fingerprinted by the metering device 230, and perform a comparison of the query fingerprints to the reference fingerprints in order to identify the piece of content or stream of content associated with the media presentation device 210. As described in further detail herein, this identification may be improved by one or more configurations of one or more components of the metering device 230.

For example, if the metering device 230 has a single microphone to capture the audio content outputted by the media presentation device 210, the metering device may not provide optimal audio content recordings and/or associated fingerprints. For example, the orientation of a microphone (for example, microphone 235*a*) of the metering device 230 used to capture the audio content may result in degraded audio content recordings (for example, a low signal-to-noise ratio for the recorded audio content). These issues with the recorded audio content may, in turn, result in a degraded quality fingerprint and/or sub-fingerprint, which may in turn result in the identification server 250 being unable to identify any reference media files that are within a threshold likelihood of being the media content.

As described in further detail below, there are a variety of reasons that the metering device 230 may not properly capture audio content outputted by the media presentation device 210, many of which may be related to a number of factors surrounding one or more the microphones 235*a*, 235*b*, and/or 235*c* (for example, orientation, configuration). For example, the media presentation device 210 and/or the metering device 230 may be moved, altered, and/or reoriented over time, which may cause one or more of microphones 235*a*, 235*b*, and/or 235*c* to be oriented in a one or more directions that are not well suited for capturing audio content outputted by the media presentation device. For example, the media presentation device 210 may be rearranged in the room or replaced with a new device with different speaker orientation. As another example, new speakers may be added to the media presentation device 210 (such as a sound bar or surround-sound speakers), altering where the audio content is originating from and/or reflecting off of. As another example, the metering device 230 may be relocated or reoriented for aesthetic reasons or it may be bumped, jostled, or knocked over and replaced in a different location or orientation. As another example, in some embodiments, the metering device 230 captures audio content from more than one media presentation device 210. This configuration may result in the same microphone of the plurality of microphones 235*a*, 235*b*, and 235*c* not being oriented to monitor all of the media presentation devices 210 at the same time or over time. For example, for a portion of time during the day a first audience member 220 may be consuming media from a first media presentation device 210 and for another portion of time during the day a second audience member 220 may be consuming media from a second media presentation device 210 located in a different area of the room. Yet another reason is that the metering device 230 may be provided to the audience member 220 and initially placed by the audience member 220 rather than being positioned by a knowledgeable technician on behalf of the operators of the audience measurement system 200.

In each of these cases, calibration of the metering device 230 may be utilized in a number of ways to select the best-oriented microphone of the plurality of microphones 235*a*, 235*b*, and 235*c*. For example, in examples, this calibration may be used as a default, as one or more previously selected microphones of the plurality of microphones may have a more effective orientation for recording and/or analyzing audio content. In a further aspect, because the metering device may change configurations and/or the audio content may change over time, a technical problem of selecting one or more microphones of the plurality of microphones of the metering device 230 is constantly presented and ever changing (for example, a higher signal-to-noise ratio may be present at a particular time). Compounding this problem is the limited processing, storage, and/or bandwidth resources available to the metering device 230. While a theoretical ideal solution would involve capturing all audio content from all of the microphones of the metering device 230, generating sets of fingerprints for the audio content captured by each microphone, communicating those sets of fingerprints to the identification server 250, and then processing each set of fingerprints to identify the set with the highest correlation rate, such an approach is inefficient because of the increased storage, processing, and bandwidth resource requirements.

Certain embodiments provide techniques for calibrating a metering device in a more efficient and consistent manner by, among other features, selecting and dynamically updating the selection of one or more microphones of the plurality of microphones 235*a*, 235*b*, 235*c* to capture audio content. In examples, this dynamic microphone evaluation and selection may be based on iterative microphone analysis in response to the audio content in the environment in which the metering device is operating, as well as based on the physical characteristics of the environment and/or the location and orientation of the metering device in that environment, any or all of which may change over time.

In examples, a default microphone of metering device 230 may be selected to capture audio content. For example, a first microphone (for example, microphone 235*a*) of the plurality of microphones may be pre-configured, hardcoded, or designated as the default microphone. As another example, a random microphone of the plurality of microphones 235*a*, 235*b*, or 235*c* may be selected as the default microphone to capture audio content. In examples, the selection of the default microphone may occur when the metering device 230 is powered on or on a fixed schedule. In examples, the selected microphone is then used to capture audio content from the media presentation device 210, generate a set of fingerprints, and communicate them to the identification server 250, as discussed above.

In example embodiments, a second microphone (for example, microphone 235*b*) of the plurality of microphones is then selected. For example, the plurality of microphones 235*a*, 235*b*, and 235*c* may have arbitrarily-assigned numeric identifiers and the second microphone is selected because it is the next higher numbered identifier after the currently selected microphone. As another example, the second microphone may be the next microphone in an arbitrary, hard-coded, or designated ordering of plurality of microphones 235*a*, 235*b*, and 235*c*, such as a round-robin ordering that selects a second microphone by moving through a sequence of microphones based on their respective locations on the metering device 230 (for example, moving in a clockwise direction around the face or faces of the metering device).

In examples, audio content is then captured by the second microphone of the plurality of microphones 235*a*, 235*b*, and 235*c* and used for comparative analysis with the audio content captured by the first microphone of the metering device. To undertake this comparative analysis, the metering device 230 may compare the number and/or rate of fingerprints generated by the metering device 230 that correspond to and/or match reference fingerprints (for example, from an identification server such as identification server 250, described in further detail below). As described herein, the number and/or rate of successful matches between fingerprints generated by the metering device 230 based on audio content captured by each microphone of the metering device and reference fingerprints is referred to herein as a "correlation rate". In examples, if the correlation rate associated with the set of fingerprints generated based on the audio content captured by the second microphone is greater than the correlation rate associated with the set of fingerprints generated based on the audio content captured by the currently selected microphone, then the metering device 230 stops receiving audio content from the currently selected microphone and instead uses the second microphone. In examples, this process may repeat periodically and/or on one or more predefined, cycling intervals. For example, the process may repeat every few seconds or minutes. In certain embodiments, the process repeats every 1, 5, 10, or 15 minutes. In examples, the intervals may be fixed, such as every 5 minutes, or variable, such as a random amount of time between 1 and 30 minutes, for example. In certain embodiments, the interval may be shortened from a default fixed interval if the correlation rate associated with the set of fingerprints most recently generated by the currently selected microphone is below a threshold. In certain embodiments, the interval may be lengthened from a default fixed interval if the correlation rate associated with the set of fingerprints most recently generated by the currently selected microphone is above a threshold. In example embodiments, this process beings based on a predetermined, fixed, or random period of time after the first microphone beings capturing audio content. For example, selection of the second microphone may occur at approximately the same time as the first microphone begins capturing audio content. As another example, the selection of the second microphone may begin after the first periodic or cycling interval has elapsed.

In examples, the audio content captured from the second microphone may not be for a full cycle or interval between iterations of the selection process. That is, although the periodic or cycling selection of the second microphone used for comparative analysis discussed above may occur, for example, every 5 minutes, the recording and processing of audio content from the second microphone may occur for only a portion of the selection interval, such as for 30 seconds. For example, the audio content captured from the second microphone may only be captured for seconds or minutes. In certain embodiments, the audio content is captured from the second microphone for 5, 7, 15, 30, or 60 seconds. The capture time may be fixed, such as for 30 seconds, or variable, such as a random amount of time between 7 and 70 seconds, in multiples of 7 seconds, for example.

In a further aspect, in other examples, by cycling through the available microphones in the plurality of microphones 235*a*, 235*b*, and 235*c*, on a periodic basis, the metering device 230 may be calibrated to use the microphone that achieves a higher correlation rate than the other microphones in an acceptable amount of time. In addition, in examples, by selecting each microphone in sequence, rather than all of the other non-active ones at the same time, storage and processing resource requirements are reduced. For example, the metering device 230 and/or other system components illustrated in FIG. 2 may improve resource allocation for, at least, the reason that audio content and sets of fingerprints only have to be stored and calculated for one additional microphone instead of for the full plurality of microphones. Further, in examples, by activating the second microphone for only a limited amount of time, storage and processing resource requirements are reduced, as less additional audio content needs to be stored for the second microphone and fewer additional fingerprints in the set of fingerprints for the second microphone need to be generated.

Furthermore, in examples, an additional benefit is that by having fewer additional sets of fingerprints generated, less bandwidth is needed to communicate the generated fingerprints to the identification server 250.

In examples, the periodic selection of a second microphone to use for the calibration reduces the storage, processing, and bandwidth requirements, as less audio content needs to be captured and have fingerprints generated and transmitted. In addition, in examples, capturing audio content using the second microphone for a limited period of time also reduces the storage, processing, and bandwidth requirements, as less audio content needs to be captured and have fingerprints generated and transmitted.

In examples, once audio content is captured by the second microphone, a second set of fingerprints is generated and communicated to the identification server 250, as with the audio content captured by the currently selected microphone, discussed above.

In examples, the identification server 250 may receive the set of fingerprints from the currently selected microphone and the second set of fingerprints from the second microphone and attempt to identify the media content associated with each set of fingerprints using the reference fingerprint library 260, as discussed above. Based on the comparisons, in examples, the identification server 250 may determine correlation rates for each of the sets of fingerprints, where the correlation rate for each set of fingerprints indicates a correlation between the set of fingerprints associated with the media content and reference fingerprints associated with a particular known media content.

In examples, once correlation rates have been determined for the set of fingerprints for the currently selected microphone and the second set of fingerprints for the second microphone, the correlation rates may be compared to determined which is greater. In example embodiments, a greater correlation rate indicates that there is a higher probability that the audio signal associated with that set of fingerprints matches a set of reference fingerprints associated with a particular reference media file. In some examples, the greater correlation for the second set of fingerprints meets or exceeds a correlation threshold. In some examples, the second set of fingerprints is determined to be greater when the first correlation rate does not meet or exceed a correlation threshold.

In some embodiments, the correlation rates are communicated to the metering device 230. The metering device 230 may then compare the correlation rates to determine whether the currently selected microphone or the second microphone has a higher correlation rate. The metering device 230 would then select the microphone with the higher correlation rate and stop receiving audio content from the microphone with the lower correlation rate.

In some embodiments, the correlation rates are compared by the identification server 250 or another computing system to identify which correlation rate is higher. The identifications server 250 or other computing system then communicates the identified microphone with the higher correlation rate to the metering device 230. The metering device 230 would then select the identified microphone with the higher correlation rate and stop receiving audio content from the microphone with the lower correlation rate.

Thus, the metering device 230 may be efficiently calibrated to select the microphone of the plurality of microphones 235*a*, 235*b*, and 235*c* of the metering device 230 which will result in a higher signal-to-noise ratio at a particular time while reducing storage, processing, and bandwidth requirements as compared to other techniques.

Figure 3A:
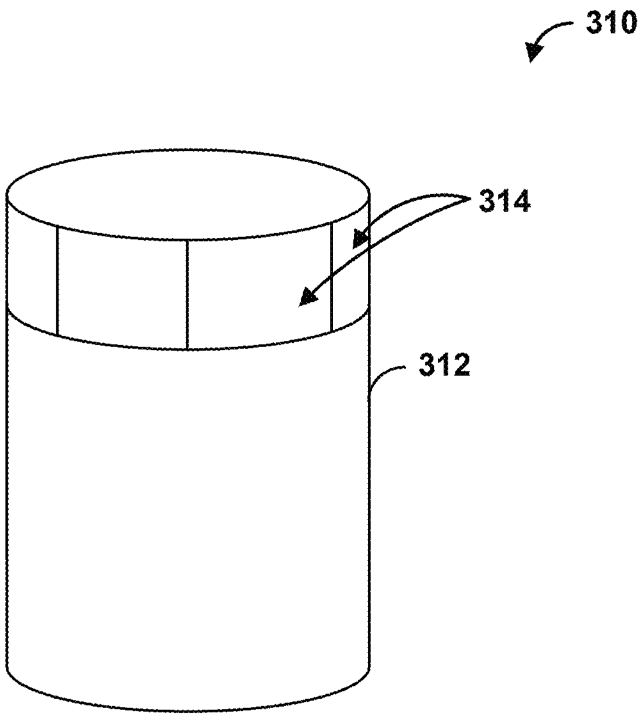
FIG. 3A illustrates an example metering device in which certain embodiments may be employed.

FIG. 3A illustrates an example metering device 310 in which certain embodiments may be employed. In some examples, the metering device 310 may be similar to the metering device 230, discussed above. In examples, the metering device 310 includes a body 312 and an array of microphones 314.

In examples, the body 312 of the metering device 310 includes components for the metering device 310 to monitor media content, such as a computing device similar to computing device 100, for example. For example, these components use the microphones 314 to capture audio content associated with the media content.

As illustrated in the example of FIG. 3A, the microphones 314 are disposed on top of the body 312 and arranged in an outward-facing circular arrangement, providing each microphone 314 with a unique orientation with respect to the metering device 310. However, in other examples, other arrangements and numbers of microphones may be used with metering device 310.

Figure 3B:
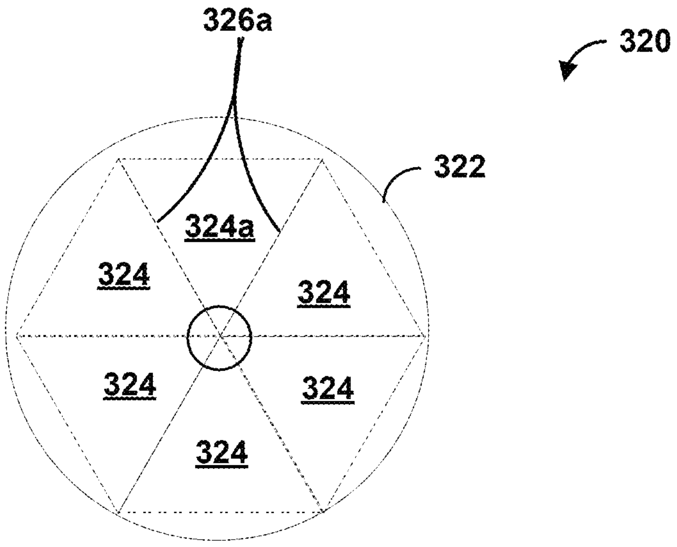
FIG. 3B illustrates an example arrangement of microphones in a metering device in which certain embodiments may be employed.

FIG. 3B illustrates an example arrangement of microphones in a metering device 320 in which certain embodiments may be employed. In some examples, the metering device 320 may be similar to the metering device 230 or the metering device 310, discussed above. In examples, the metering device 320 includes a body 322 and an array of microphones 324.

In examples, the body 322 of the metering device 320 includes components for the metering device 320 to monitor media content, such as a computing device similar to computing device 100, for example. For example, these components use the microphones 324 to capture audio content associated with the media content.

As illustrated in the example of FIG. 3B, six microphones 324 are arranged in a circular arrangement and equidistantly spaced (compared to one another). This results in each microphone having a 60-degree field that it covers. However, in other examples, other arrangements and numbers of microphones may be used with metering device 320.

In addition, as illustrated in FIG. 3B, each microphone 324 includes an acoustic waveguide, such as acoustic waveguide 326*a* for microphone 324*a*. An acoustic waveguide physically blocks direct sound waves from angles outside the direction of the waveguide and amplifies sound waves from that direction. In example embodiments, the acoustic waveguide provides better interference immunity and signal-to-noise ratio (as the signal is increased while noise remains approximately constant).

Figure 4:
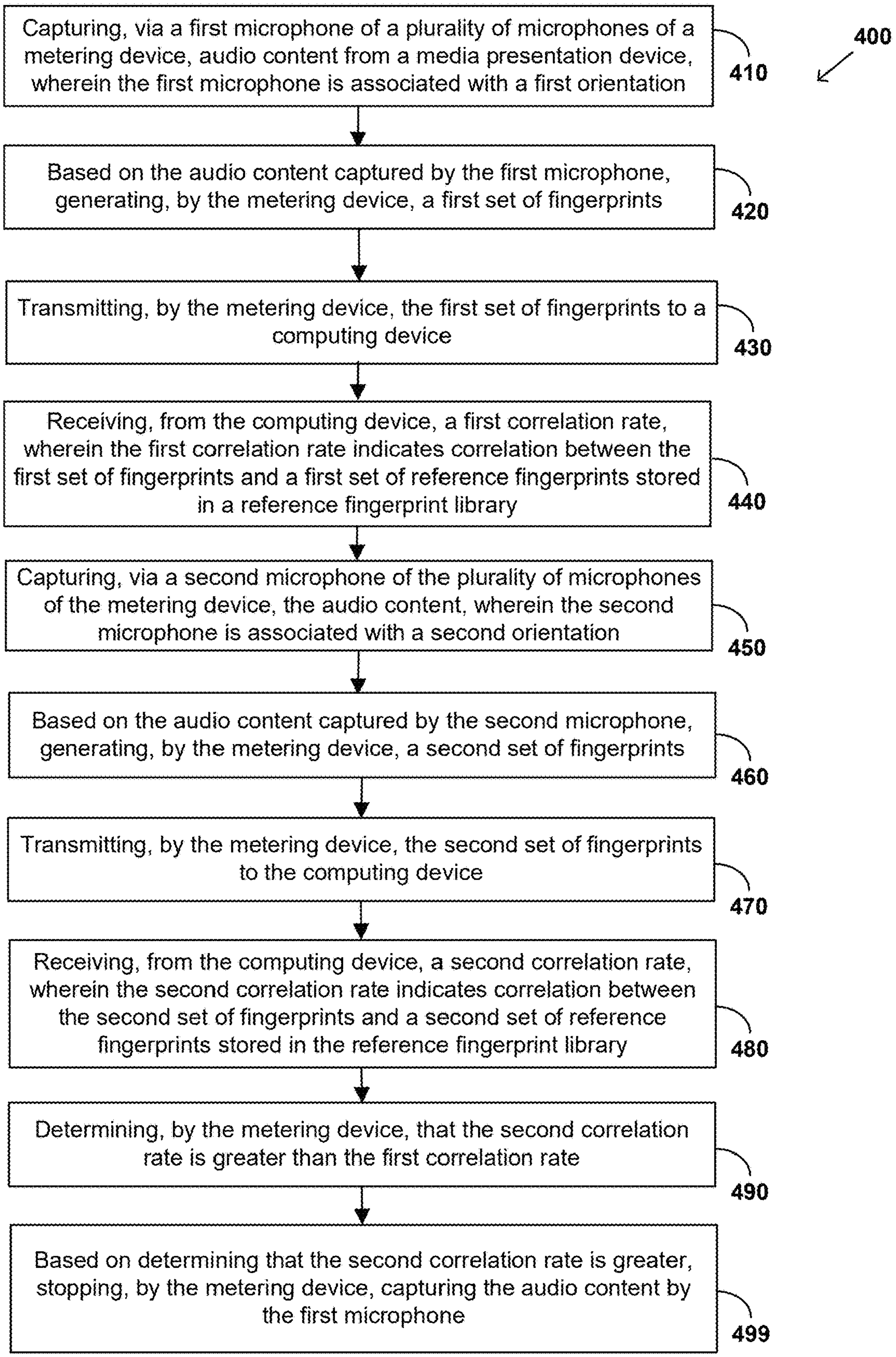
FIG. 4 illustrates a flow chart of an example method of certain embodiments.

FIG. 4 illustrates a flow chart of an example method 400 of certain embodiments. The method 400 may be carried out by a computing system, such as the audience measurement system 200, or by a component thereof, such as the metering device 230, or more generally, by a computing system including a computing device such as computing device 100.

At block 410, the method 400 includes capturing, via a first microphone of a plurality of microphones of a metering device, audio content from a media presentation device, wherein the first microphone is associated with a first orientation. The first microphone may be one of the plurality of microphones 235 of metering device 230, for example. The media presentation device may be similar to the media presentation device 210, for example. The audio signal may be associated with media content provided by the media presentation device 210, for example. In examples, each microphone of the plurality of microphones includes a directional microphone associated with a particular orientation, and wherein each microphone includes a waveguide. In examples, the plurality of microphones includes six microphones, wherein the six microphones are arranged in a circular arrangement. In examples, the six microphones are arranged in an equidistant arrangement.

At block 420, the method 400 includes based on the audio content captured by the first microphone, generating, by the metering device, a first set of fingerprints. In some embodiments, the first set of fingerprints is generated by a metering device, such as the metering device 230. In some embodiments, the first set of fingerprints is generated by a device separate from the metering device 230.

At block 430, the method 400 includes transmitting, by the metering device, the first set of fingerprints to a computing device. In some examples, the computing device includes an identification server, such as identification server 250.

At block 440, the method 400 includes receiving, from the computing device, a first correlation rate, wherein the first correlation rate indicates correlation between the first set of fingerprints and a first set of reference fingerprints stored in a reference fingerprint library. The reference fingerprint library may be the reference fingerprint library 260, for example. Based on the comparisons, the identification server 250 determines correlation rates for the first sets of fingerprints, where the correlation rate for the first set of fingerprints indicates a correlation between the first set of fingerprints and reference fingerprints associated with a particular known media content. In some embodiments, the first correlation rate is determined by a computing system separate from the metering device. For example, the first correlation rate may be determined by the identification server 250. In examples, transmitting the first set of fingerprints includes transmitting, by the metering device, to the computing device, (i) at least a portion of the first set of fingerprints and (ii) an instruction that causes the computing device to compare at least the portion of the first set of fingerprints to the first set of reference fingerprints, and wherein receiving, from the computing device, the first correlation rate, includes receiving, from the computing device, an indication of a particular reference audio content item of a plurality of reference audio content items that matches the portion of the first set of fingerprints.

At block 450, the method 400 includes capturing, via a second microphone of the plurality of microphones of the metering device, the audio content, wherein the second microphone is associated with a second orientation. In examples, the second microphone begins capturing the audio content based on a predetermined period of time after the first microphone begins capturing the audio content. In examples, the second microphone captures the audio content for a predetermined period of time. The second microphone may be one of the plurality of microphones 235 of metering device 230 other than the first microphone, for example. The media presentation device may be similar to the media presentation device 210, for example. The audio signal may be associated with media content provided by the media presentation device 210, for example.

At block 460, the method 400 includes based on the audio content captured by the second microphone, generating, by the metering device, a second set of fingerprints. In some embodiments, the second set of fingerprints is generated by a metering device, such as the metering device 230. In some embodiments, the second set of fingerprints is generated by a device separate from the metering device 230.

At block 470, the method 400 includes transmitting, by the metering device, the second set of fingerprints to the computing device.

At block 480, the method 400 includes receiving, from the computing device, a second correlation rate, wherein the second correlation rate indicates correlation between the second set of fingerprints and a second set of reference fingerprints stored in the reference fingerprint library. The reference fingerprint library may be the reference fingerprint library 260, for example. Based on the comparisons, the identification server 250 determines correlation rates for the second sets of fingerprints, where the correlation rate for the second set of fingerprints indicates a correlation between the second set of fingerprints and reference fingerprints associated with a particular known media content. In some embodiments, the second correlation rate is determined by a computing system separate from the metering device. For example, the second correlation rate may be determined by the identification server 250. In examples, transmitting the second set of fingerprints includes transmitting, by the metering device, to the computing device, (i) at least a portion of the second set of fingerprints and (ii) an instruction that causes the computing device to compare at least the portion of the second set of fingerprints to the second set of reference fingerprints, and wherein receiving, from the computing device, the second correlation rate, includes receiving, from the computing device, an indication of a particular reference audio content item of a plurality of reference audio content items that matches the portion of the second set of fingerprints.

At block 490, the method 400 includes determining, by the metering device, that the second correlation rate is greater than the first correlation rate. In examples, determining that the second correlation rate is greater than the first correlation rate includes determining that the second correlation rate meets or exceeds a correlation threshold. In some examples, determining that the second correlation rate is greater than the first correlation rate further includes determining that the first correlation rate does not meet or exceed the correlation threshold. In some embodiments, the determination is made by the metering device 230. For example, the first and second correlation rates may be communicated to the metering device 230 to perform the determination. In some embodiments, the determination is made by the identification server 250. For example, the identification server 250 may compare the first and second correlation rates and then communicate to the metering device 230 an identifier for the microphone associated with the greater correlation rate.

At block 499, the method 400 includes based on determining that the second correlation rate is greater, stopping, by the metering device, capturing the audio content by the first microphone. By stopping receiving the audio signal by the microphone with the lower correlation rate, the metering device 230 may continue receiving the audio content using the microphone with the greater correlation rate, making that microphone the currently selected microphone. This process may then repeat periodically, as discussed above.

In examples, method 400 further includes (i) capturing, via a third microphone of the plurality of microphones of the metering device, the audio content, wherein the third microphone is associated with a third orientation; (ii) based on the audio content received by the third microphone, generating, by the metering device, a third set of fingerprints; (iii) transmitting, by the metering device, the third set of fingerprints to the computing device; (iv) receiving, from the computing device, a third correlation rate, wherein the third correlation rate indicates correlation between the third set of fingerprints and a third set of reference fingerprints stored in the reference fingerprint library; (v) determining, by the metering device, that the third correlation rate is greater than the second correlation rate; and (vi) based on determining that the third correlation rate is greater, stopping, by the metering device, capturing the audio content by the second microphone. In examples, the third microphone includes the first microphone.

In one aspect, a tangible, non-transitory computer readable medium including instructions that, when executed, cause at least one processor to perform a set of operations is disclosed. In examples, the set of operations includes (i) capturing, via a first microphone of a plurality of microphones of a metering device, audio content from a media presentation device, wherein the first microphone is associated with a first orientation; (ii) based on the audio content captured by the first microphone, generating, by the metering device, a first set of fingerprints; (iii) transmitting, by the metering device, the first set of fingerprints to a computing device; (iv) capturing, via a second microphone of the plurality of microphones of the metering device, the audio content, wherein the second microphone is associated with a second orientation; (v) based on the audio content captured by the second microphone, generating, by the metering device, a second set of fingerprints; (vi) transmitting, by the metering device, the second set of fingerprints to the computing device; (vii) receiving, from the computing device, an indication that a second correlation rate is greater than the first correlation rate, wherein the first correlation rate indicates correlation between the first set of fingerprints and a first set of reference fingerprints stored in a reference fingerprint library, wherein the second correlation rate indicates correlation between the second set of fingerprints and a second set of reference fingerprints stored in the reference fingerprint library, wherein the indication that the second correlation rate is greater than the first correlation rate is determined by the computing device; and (viii) based on determining that the second correlation rate is greater, stopping, by the metering device, capturing the audio content by the first microphone.

In one aspect, a computing system including at least one processor and a tangible, non-transitory computer readable medium including instructions that, when executed, cause the at least one processor to perform a set of operations is disclosed. In examples, the set of operations includes: (i) capturing, via a first microphone of a plurality of microphones of a metering device, audio content from a media presentation device, wherein the first microphone is associated with a first orientation; (ii) based on the audio content captured by the first microphone, generating, by the metering device, a first set of fingerprints; (iii) transmitting, by the metering device, the first set of fingerprints to a computing device; (iv) receiving, from the computing device, a first correlation rate, wherein the first correlation rate indicates correlation between the first set of fingerprints and a first set of reference fingerprints stored in a reference fingerprint library; (v) capturing, via a second microphone of the plurality of microphones of the metering device, the audio content, wherein the second microphone is associated with a second orientation; (vi) based on the audio content captured by the second microphone, generating, by the metering device, a second set of fingerprints; (vii) transmitting, by the metering device, the second set of fingerprints to the computing device; (viii) receiving, from the computing device, a second correlation rate, wherein the second correlation rate indicates correlation between the second set of fingerprints and a second set of reference fingerprints stored in the reference fingerprint library; (ix) determining, by the metering device, that the second correlation rate is greater than the first correlation rate; and (x) based on determining that the second correlation rate is greater, stopping, by the metering device, capturing the audio content by the first microphone.

The present disclosure is not to be limited in terms of the particular embodiments described in this application, which are intended as illustrations of various aspects. Many modifications and variations may be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments may be utilized, and other changes may be made, without departing from the scope of the subject matter presented herein. It will be readily understood that the aspects of the present disclosure, as generally described herein, and illustrated in the figures, may be arranged, substituted, combined, separated, and designed in a wide variety of different configurations.

With respect to any or all of the message flow diagrams, scenarios, and flow charts in the figures and as discussed herein, each step, block, and/or communication may represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages may be executed out of order from that shown or discussed, including substantially concurrently or in reverse order, depending on the functionality involved. Further, more or fewer blocks and/or operations may be used with any of the message flow diagrams, scenarios, and flow charts discussed herein, and these message flow diagrams, scenarios, and flow charts may be combined with one another, in part or in whole.

A step or block that represents a processing of information may correspond to circuitry that may be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including RAM, a disk drive, a solid-state drive, or another storage medium.

The computer readable medium may also include non-transitory computer readable media such as non-transitory computer readable media that store data for short periods of time like register memory and processor cache. The non-transitory computer readable media may further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media may also be any other volatile or non-volatile storage systems. A non-transitory computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments could include more or less of each element shown in a given figure. Further, some of the illustrated elements may be combined or omitted. Yet further, an example embodiment may include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method for calibrating a metering device, wherein the method comprises:

capturing, via a first microphone of a plurality of microphones of the metering device, audio content from a media presentation device, wherein the first microphone is associated with a first orientation;

based on the audio content captured by the first microphone, generating, by the metering device, a first set of fingerprints;

transmitting, by the metering device, the first set of fingerprints to a computing device;

receiving, from the computing device, a first correlation rate, wherein the first correlation rate indicates correlation between the first set of fingerprints and a first set of reference fingerprints stored in a reference fingerprint library;

capturing, via a second microphone of the plurality of microphones of the metering device, the audio content, wherein the second microphone is associated with a second orientation;

based on the audio content captured by the second microphone, generating, by the metering device, a second set of fingerprints;

transmitting, by the metering device, the second set of fingerprints to the computing device;

receiving, from the computing device, a second correlation rate, wherein the second correlation rate indicates correlation between the second set of fingerprints and a second set of reference fingerprints stored in the reference fingerprint library;

determining, by the metering device, that the second correlation rate is greater than the first correlation rate; and based on determining that the second correlation rate is greater, stopping, by the metering device, capturing the audio content by the first microphone.

2. The method of claim 1, wherein the second microphone begins capturing the audio content based on a predetermined period of time after the first microphone begins capturing the audio content.

3. The method of claim 1, wherein the second microphone captures the audio content for a predetermined period of time.

4. The method of claim 1, further including:

capturing, via a third microphone of the plurality of microphones of the metering device, the audio content, wherein the third microphone is associated with a third orientation;

based on the audio content received by the third microphone, generating, by the metering device, a third set of fingerprints;

transmitting, by the metering device, the third set of fingerprints to the computing device;

receiving, from the computing device, a third correlation rate, wherein the third correlation rate indicates correlation between the third set of fingerprints and a third set of reference fingerprints stored in the reference fingerprint library;

determining, by the metering device, that the third correlation rate is greater than the second correlation rate; and based on determining that the third correlation rate is greater, stopping, by the metering device, capturing the audio content by the second microphone.

5. The method of claim 4, wherein the third microphone comprises the first microphone.

6. The method of claim 1, wherein determining that the second correlation rate is greater than the first correlation rate comprises determining that the second correlation rate meets or exceeds a correlation threshold.

7. The method of claim 6, wherein determining that the second correlation rate is greater than the first correlation rate further comprises determining that the first correlation rate does not meet or exceed the correlation threshold.

8. The method of claim 1, wherein each microphone of the plurality of microphones comprises a directional microphone associated with a particular orientation, and wherein each microphone comprises a waveguide.

9. The method of claim 8, wherein the plurality of microphones comprises six microphones, wherein the six microphones are arranged in a circular arrangement.

10. The method of claim 9, wherein the six microphones are arranged in an equidistant arrangement.

11. The method of claim 1, wherein the computing device comprises an identification server.

12. The method of claim 1, wherein transmitting the first set of fingerprints comprises transmitting, by the metering device, to the computing device, (i) at least a portion of the first set of fingerprints and (ii) an instruction that causes the computing device to compare at least the portion of the first set of fingerprints to the first set of reference fingerprints, and wherein receiving, from the computing device, the first correlation rate, comprises receiving, from the computing device, an indication of a particular reference audio content item of a plurality of reference audio content items that matches the portion of the first set of fingerprints.

13. The method of claim 1, wherein transmitting the second set of fingerprints comprises transmitting, by the metering device, to the computing device, (i) at least a portion of the second set of fingerprints and (ii) an instruction that causes the computing device to compare at least the portion of the second set of fingerprints to the second set of reference fingerprints, and wherein receiving, from the computing device, the second correlation rate, comprises receiving, from the computing device, an indication of a particular reference audio content item of a plurality of reference audio content items that matches the portion of the second set of fingerprints.

14. The method of claim 1, wherein the first correlation rate is based on comparing the first set of fingerprints to the first set of reference fingerprints and determining that a particular reference fingerprint of the first set of reference fingerprints has at least a threshold extent of similarity with at least one fingerprint of the first set of fingerprints.

15. The method of claim 1, wherein the second correlation rate is based on comparing the second set of fingerprints to the second set of reference fingerprints and determining that a particular reference fingerprint of the second set of reference fingerprints has at least a threshold extent of similarity with at least one fingerprint of the second set of fingerprints.

16. A tangible, non-transitory computer readable medium comprising instructions that, when executed, cause at least one processor to perform a set of operations comprising:

capturing, via a first microphone of a plurality of microphones of a metering device, audio content from a media presentation device, wherein the first microphone is associated with a first orientation;

based on the audio content captured by the first microphone, generating, by the metering device, a first set of fingerprints;

transmitting, by the metering device, the first set of fingerprints to a computing device;

capturing, via a second microphone of the plurality of microphones of the metering device, the audio content, wherein the second microphone is associated with a second orientation;

based on the audio content captured by the second microphone, generating, by the metering device, a second set of fingerprints;

transmitting, by the metering device, the second set of fingerprints to the computing device;

receiving, from the computing device, an indication that a second correlation rate is greater than a first correlation rate, wherein the first correlation rate indicates correlation between the first set of fingerprints and a first set of reference fingerprints stored in a reference fingerprint library, wherein the second correlation rate indicates correlation between the second set of fingerprints and a second set of reference fingerprints stored in the reference fingerprint library, wherein the indication that the second correlation rate is greater than the first correlation rate is determined by the computing device; and based on determining that the second correlation rate is greater, stopping, by the metering device, capturing the audio content by the first microphone.

17. The tangible, non-transitory computer readable medium of claim 16, wherein the second microphone begins capturing the audio content based on a predetermined period of time after the first microphone begins capturing the audio content.

18. The tangible, non-transitory computer readable medium of claim 16, wherein the second microphone receives the audio content for a predetermined period of time.

19. The tangible, non-transitory computer readable medium of claim 16, wherein the computing device comprises an identification server.

20. A computing system comprising:

at least one processor; and tangible, non-transitory computer readable medium comprising instructions that, when executed, cause the at least one processor to perform a set of operations comprising:

capturing, via a first microphone of a plurality of microphones of a metering device, audio content from a media presentation device, wherein the first microphone is associated with a first orientation;

based on the audio content captured by the first microphone, generating, by the metering device, a first set of fingerprints;

transmitting, by the metering device, the first set of fingerprints to a computing device;

receiving, from the computing device, a first correlation rate, wherein the first correlation rate indicates correlation between the first set of fingerprints and a first set of reference fingerprints stored in a reference fingerprint library;

capturing, via a second microphone of the plurality of microphones of the metering device, the audio content, wherein the second microphone is associated with a second orientation;

based on the audio content captured by the second microphone, generating, by the metering device, a second set of fingerprints;

transmitting, by the metering device, the second set of fingerprints to the computing device;

receiving, from the computing device, a second correlation rate, wherein the second correlation rate indicates correlation between the second set of fingerprints and a second set of reference fingerprints stored in the reference fingerprint library;

determining, by the metering device, that the second correlation rate is greater than the first correlation rate; and based on determining that the second correlation rate is greater, stopping, by the metering device, capturing the audio content by the first microphone.

* * * * *